(No Model.) 2 Sheets—Sheet 1.

H. A. MURPHY.
HARROW FOR LISTED CROPS.

No. 378,611. Patented Feb. 28, 1888.

WITNESSES:
D. C. Reusch.
E. M. Clark.

INVENTOR:
H. A. Murphy,
BY Munn & Co
ATTORNEYS.

(No Model.) 2 Sheets—Sheet 2.
H. A. MURPHY.
HARROW FOR LISTED CROPS.
No. 378,611. Patented Feb. 28, 1888.
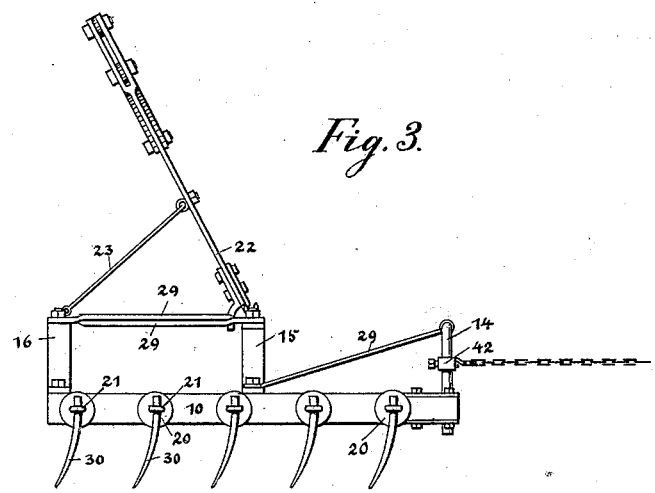
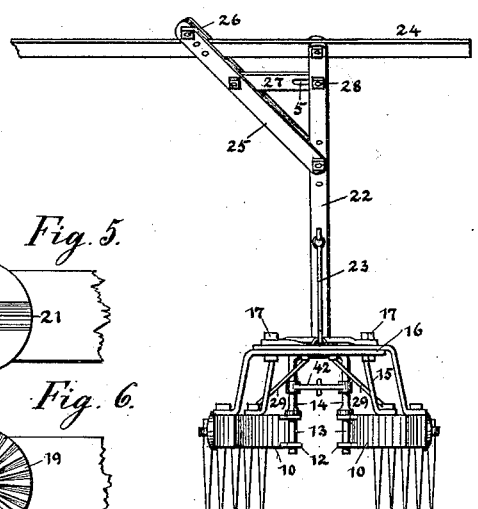
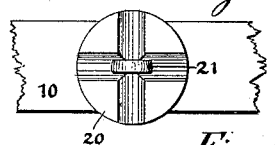
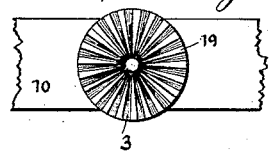
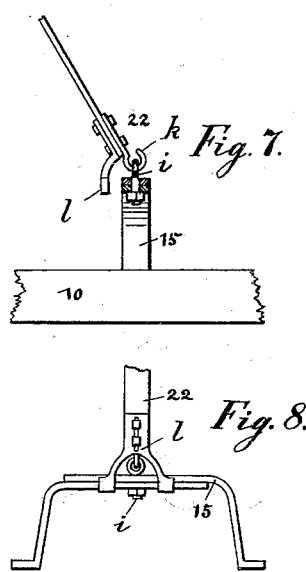
WITNESSES:
D. C. Reusch.
E. M. Clark.
INVENTOR:
H. A. Murphy,
BY Munn & Co.
ATTORNEYS.

UNITED STATES PATENT OFFICE.

HUGH ANDERSON MURPHY, OF ELK CITY, KANSAS.

HARROW FOR LISTED CROPS.

SPECIFICATION forming part of Letters Patent No. 378,611, dated February 28, 1888.

Application filed July 21, 1887. Serial No. 244,886. (No model.)

*To all whom it may concern:*

Be it known that I, HUGH ANDERSON MURPHY, of Elk City, in the county of Montgomery and State of Kansas, have invented a new and Improved Harrow for Listed Crops, of which the following is a full, clear, and exact description.

This invention relates to a novel form of cultivator, which is in the form of a harrow, and is designed for use in the breaking or pulverizing of the ground around listed corn or other crops planted in a similar manner, the object of the invention being to provide an implement by which ground that has become hard baked may be broken up and pulverized; and to this end the invention consists, essentially, of a number of narrow harrow-sections that are yieldingly supported by elevated connecting-rods, the harrow-sections being made adjustable, all as will be hereinafter more fully described, and specifically pointed out in the claims.

Reference is to be had to the accompanying drawings, forming a part of this specification, in which similar figures of reference indicate corresponding parts in all the views.

Figure 1:
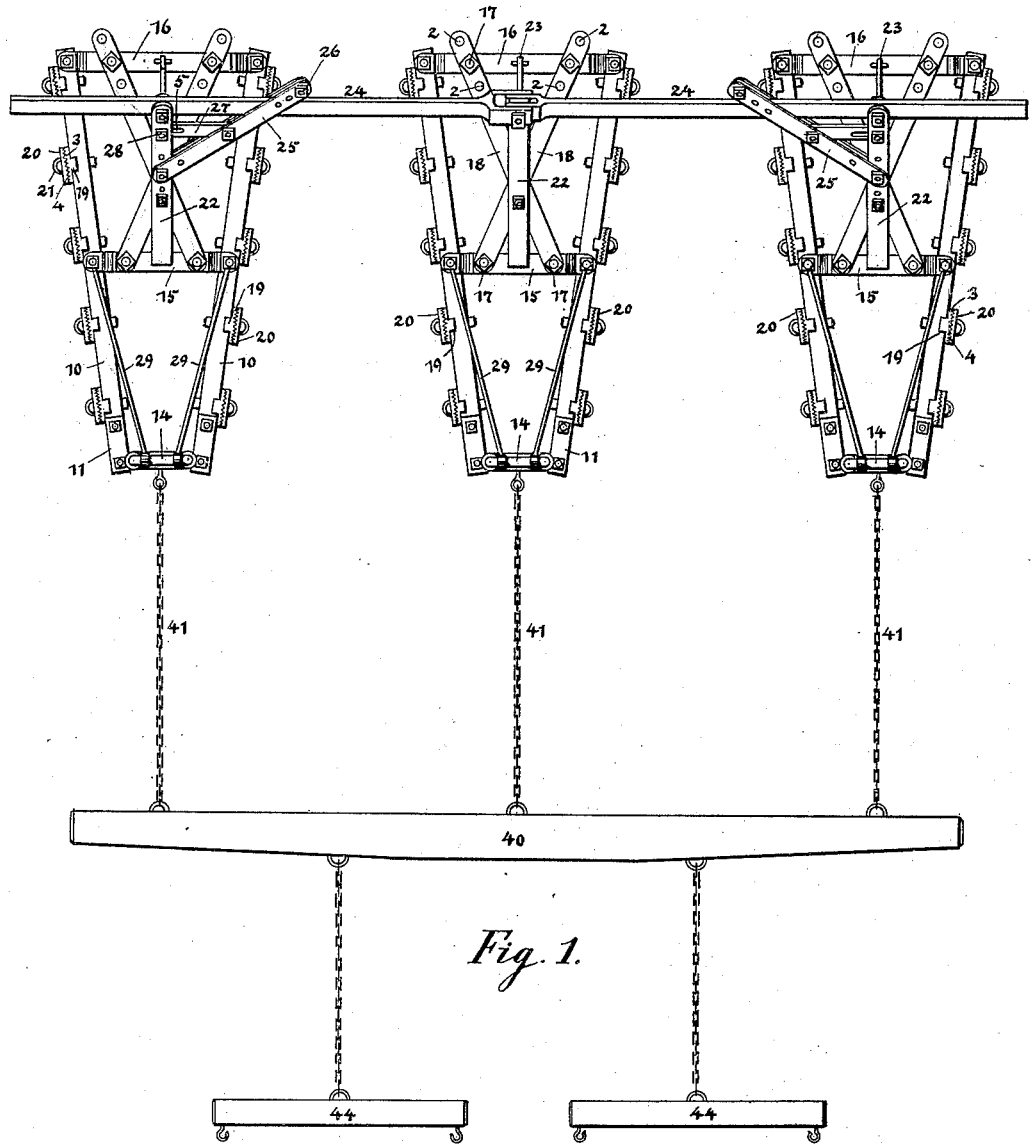
Figure 2:
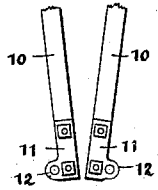

Figure 1 is a plan view of my improved form of harrow, three harrow-sections being represented as in position for cultivating corn that is above the ground. Fig. 2 is a detail view illustrating the arrangement of the harrow-beams when the harrows are adjusted for use upon ground before the crop has come up. Fig. 3 is a side view of one of the harrow-sections. Fig. 4 is a rear view of one of the sections adjusted as represented in Fig. 1. Figs. 5 and 6 are detail views illustrating the construction of my improved tooth-connection. Fig. 7 is a view illustrating the connection between the central bridge and the standard, and Fig. 8 is a front view of the construction illustrated in Fig. 7.

In the drawings, 10 represents harrow-beams, to the forward ends of which there are bolted plates 11, that are formed with apertured ears 12, such plates being arranged above and below the forward ends of the beams. Through the apertures of the ears 12, I pass the legs 13 of a connecting-arch, 14, the harrow-beams extending toward the rear and at an angle from said arch, to be held in position by a central extensible bridge, 15, and a rear extensible bridge, 16, the two bridges being each formed with slotted overlapping portions that are clamped together by bolts 17, while the two bridges are in turn connected by diagonal braces 18, which are formed with a number of apertures, 2, through any proper pair of which the bolts 17, arranged in connection with the rear bridges, may be passed.

To the outer faces of the harrow-beams I connect castings 19, that are formed with radial serrations 3, and to these castings there are held outer castings, 20, formed with similar serrations, 4, the two castings being held together by eyebolts 21, through the eyes of which I pass the shanks of the harrow-teeth, cutters, or narrow shovels which I employ to pulverize the ground, rearwardly-extending harrow-teeth 30 being represented in the drawings.

From the construction described it will be seen that the teeth or other pulverizing devices held by the eyebolts 21 may be set at such angle as may be required to properly operate upon the ground.

To the central bridge, 15, I swivel an upwardly and rearwardly extending standard, 22, which is supported by a diagonal brace, 23, that extends from the standard 22 to the rear bridge, 16, and the upper end of this standard 22 is connected to a horizontal transverse connecting-rod, 24; but in the case of the standard 22 of the central harrow connection is established with the ends of the two connecting-rods, and this connection in all cases is a pivotal or loose connection. In the case of the outer harrow-sections I arrange double adjustable diagonal braces 25, which are pivotally connected to the standards 22, and are held above the connecting-rod 24 by bolts 26, and these diagonal braces are in turn connected with the standards by short horizontal braces 27, which are bolted to the diagonal braces and to the standards 22, connection between the standards and the braces 27 being established by means of bolts 28, which pass through slots 5, that are formed in the braces 27.

The arches 14 are braced by rearwardly-extending braces 29, which are arranged as clearly shown in Figs. 1 and 3. Each of the harrow-sections is connected to an evener, 40, by a chain, 41, connection between the chain and the arches being established by means of a vertically-adjustable clip, 42, and the whiffletrees 44 are connected to the evener 40 at points midway between the chains 41.

The swivel-connection between the standard 22 and the bridge 15 is established by means of an eyebolt, *i*, secured to the bridge, and a hook, *k*, that is bolted to the standard, the hook engaging the eye, as best shown in Fig. 7.

In order that there may not be too much play upon the swivel-connection above described, I fix a double-armed stop, *l*, to the standard 22, the arms of said stop bearing against the rear edge of the bridge 15, thus limiting its movement, and in order that the range of movement may be varied I adjustably connect the stop to the standard, as is shown in Fig. 8.

In using such an implement as the one above described upon the corn or any other plant that is above the ground, the harrow-sections are adjusted, preferably, as represented in Fig. 1, and placed in the hollows in which the plants are growing, the team walking upon the ridges between said hollows, and the plants passing beneath the arches 14 and entering the bridges 15 and 16 as the team advances; and in practice it will be found that, owing to the peculiar construction of the harrow-sections and the novel connection of such sections above described, the harrow-teeth may be adjusted so as to closely approach but not injure the growing plants, the arrangement being such that each harrow-section is free to adjust itself so that it will conform with the inequalities of its particular drill or hollow. When it is desired to use the implement in connection with seed that has not yet come up, the plates 11 are removed and their position reversed, so that the legs 13 of the arches 14 will pass upon the outside of the beams, thus bringing the harrow-teeth closer together and pulverizing the ground almost directly above the germinating seed.

Although I have illustrated and described my harrow as arranged in three sections, it will of course be understood that four, five, or more sections could be employed, the team being properly connected to the evener, so as to properly equalize the draft.

Having thus fully described my invention, I claim as new and desire to secure by Letters Patent—

1. The combination, with the harrow-beams and a forward arched bar pivotally connecting the forward ends of the beams together, of a central and rear extensible bridge and diagonal braces connecting the said central and rear bridges, substantially as herein shown and described.

2. The combination, with two or more harrow-sections, of standards swiveled to the said sections, and an elevated connecting-bar to which the upper ends of the standards are secured, substantially as herein shown and described.

3. The combination, with two or more harrow-sections, each having their beams connected by cross-bars, of standards swiveled to one of the said cross-bars, a connecting-bar to which the upper ends of the standards are secured, and braces extending from the rear cross-bars to the standards, substantially as herein shown and described.

4. The combination, with two or more harrow-sections, each having their beams connected by arched bars or bridges, of standards swiveled to one of the said arched bars or bridges of each harrow-section and provided with downwardly-projecting stops on their rear sides, a connecting-bar to which the upper ends of the standards are secured, and braces extending from the rear arched bar or bridge of each section to the swiveled standard of said section, substantially as herein shown and described.

5. The combination, with the harrow-sections, of the standards 22, swiveled to the said sections, the sectional connecting bar or rod 24, connected to the upper ends of the standards of the side sections, and their ends pivotally connected to the standard of the central section, and the braces 25 and 27, secured to the standards of the side sections and to the said connecting bar or rod, substantially as herein shown and described.

6. The combination, with harrow-beams 10, of plates 11, formed with apertured ears 12, arches 14, formed with legs 13, which pass through the apertures of the ears 12, a central adjustable bridge, 15, and a rear adjustable bridge, 16, substantially as described.

7. The combination, with harrow-beams 10, of plates 11, formed with apertured ears 12, arches 14, formed with legs 13, which pass through the apertures of the ears 12, a central adjustable bridge, 15, a rear adjustable bridge, 16, a standard, 22, connected to the bridge 15, and a brace extending from the standard to the bridge 15, substantially as described.

8. The combination, with the harrow-beams 10 and the arched bar 14, pivotally connecting the forward ends of the said beams, of the adjustable arched bars or bridges 15 and 16 and the diagonal braces 18, pivoted to the bridge 15, and having their rear ends adjustably connected to the bridge 16, substantially as herein shown and described.

9. The combination, with the bridge 15 and the standard 22, pivoted thereto, of the double-armed stop *l*, secured to the standard, substantially as herein shown and described.

HUGH ANDERSON MURPHY.

Witnesses:
J. A. BROWN,
O. D. WRIGHT.